B. VOGELER.
CHAIN RAMMER.
APPLICATION FILED SEPT. 11, 1909.
987,513.
Patented Mar. 21, 1911.
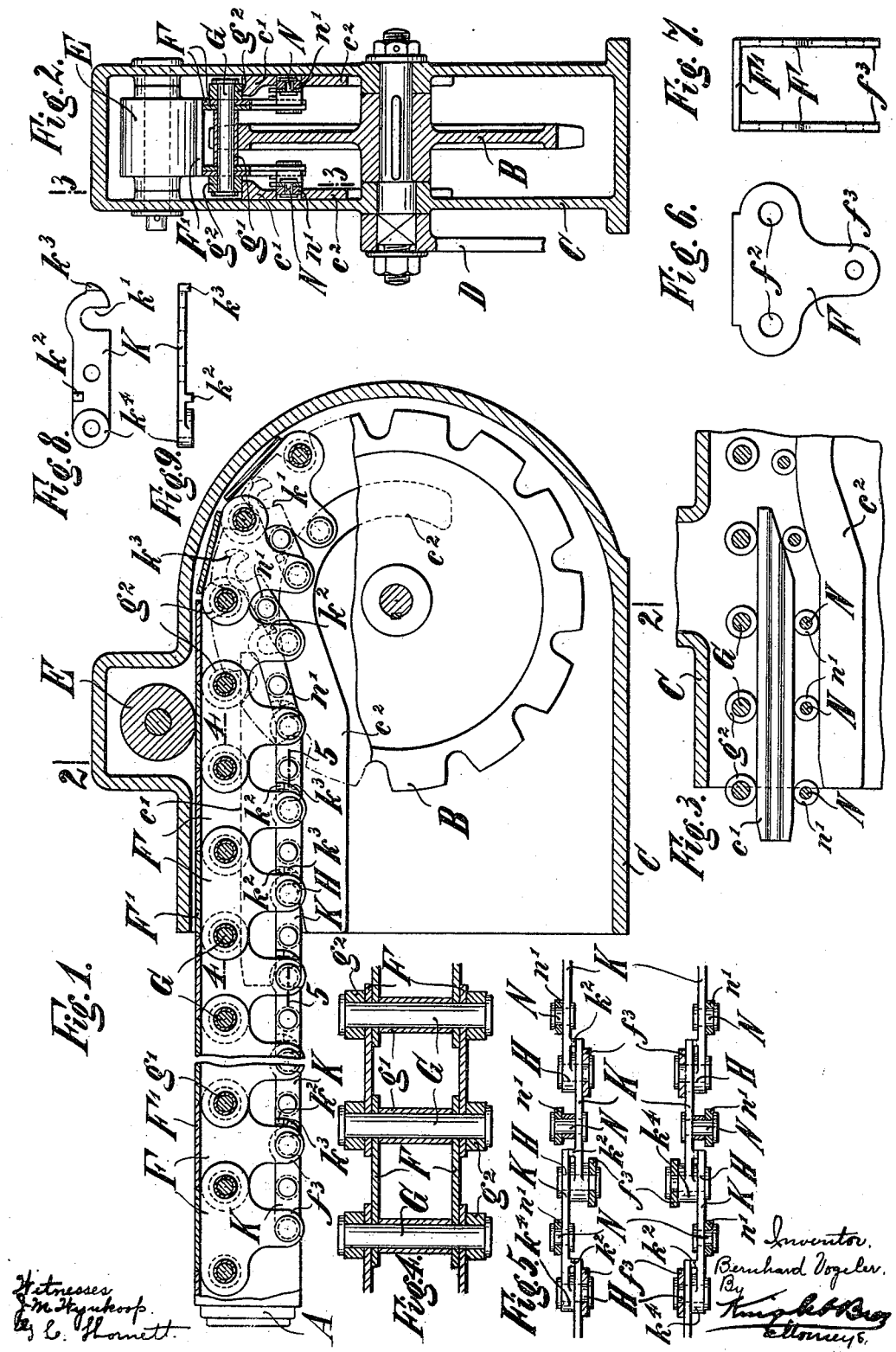

UNITED STATES PATENT OFFICE.

BERNHARD VOGELER, OF ESSEN-ON-THE-RUHR, GERMANY, ASSIGNOR TO FRIED. KRUPP AKTIENGESELLSCHAFT, OF ESSEN-ON-THE-RUHR, GERMANY.

CHAIN RAMMER.

987,513.  Specification of Letters Patent.  Patented Mar. 21, 1911.

Application filed September 11, 1909. Serial No. 517,309.

*To all whom it may concern:*

Be it known that I, BERNHARD VOGELER, a subject of the Emperor of Germany, and a resident of 28 Andreasstrasse, Essen-on-the Ruhr, Germany, have invented certain new and useful Improvements in Chain Rammers, of which the following is a specification.

The present invention relates to a link chain which in its stretched position is secured against bending. Chains of this type are for instance used in ammunition-rammers.

The accompanying drawings show an embodiment of the chain according to the present invention, the chain being shown applied to an ammunition-rammer.

Figure 1 is a vertical longitudinal section through the ammunition-rammer; Fig. 2 is a section on line 2—2, Fig. 1, looking from the left; Fig. 3 shows a part of a section on line 3—3, Fig. 2, looking from the right; Fig. 4 is a section on line 4—4, Fig. 1, looking from above; Fig. 5 is a top view, partly in section on line 5—5, Fig. 1; Fig. 6 is a side view of a detail; Fig. 7 is a front view of Fig. 6; Fig. 8 is a side view of another detail, and Fig. 9 is a top view of Fig. 8. Figs. 4 to 9 are on an enlarged scale.

The chain of the ammunition-rammer carries the rammer-head A (Fig. 1) and passes over a chain-wheel B which is journaled in the rammer-housing C and can be driven by means of a crank D (Fig. 2). A guide-roller E is also journaled in the rammer-housing C and serves for guiding the chain.

The separate links of the chain are formed by ⊓-shaped links which are of alternately different width. Each chain-link consists of two side-members F and a cross-member $F^1$ (see especially Figs. 6 and 7) connecting the side-members F. By means of hinge-bolts G, for which corresponding bores $f^2$ (Fig. 6) are provided in the side-members F, the links of the chain are connected with one another in such a manner that the side-members of the narrower links pass between and engage the side-members of the wide links (Fig. 4). A sleeve $g^1$ is loosely rotatably mounted on that part of each hinge-bolt G which is located between the side-members F. These sleeves serve the purpose of reducing the friction between the chain and the chain-wheel B and they also serve for stiffening the side-members of the links against one another. The free ends of the bolts G carry rollers $g^2$ which can roll on rails $c^1$ (see especially Figs. 2 and 3) on the housing C when the chain is being moved into and out of the housing. The side-members F of the links are substantially of T-shape; a bolt H is secured on that arm $f^3$ of the side-members F which is directed downwardly when the chain is stretched. A clamp K is rotatably but non-slidably arranged on each bolt H. These clamps serve for coupling the links of the chain together when the chain is in the stretched position. To that end the clamps are provided with a notch $k^1$ which can enter into engagement with the bolt H of the adjacent link. Furthermore, each clamp K is provided with two lateral projections $k^2$ and $k^3$ (see especially Figs. 8 and 9) which serve for securing the clamps against release in the positions in which they couple the links together. The projection $k^3$ is located on the free end of the clamp while the other projection $k^2$ is located between the nave $k^4$ of the clamp and the projection $k^3$. The clamps K are further provided with a pin N on which is journaled a roller $n^1$. In addition to the rail $c^1$ a second guide-rail $c^2$ for the rollers $n^1$ is provided on each inner side of the housing C. The guide-rails $c^1$ $c^2$ are formed in such a manner that as the rollers $n^1$ move along on the rails the clamps K are moved into the coupling position when the chain is being moved out of the housing and when the chain is being moved into the housing the clamps are shifted from the coupling position into a position which permits of the chain being wound up on the chain-wheel B. The arrangement of the bolts G and H is selected in such a manner that, when the chain is in the stretched position, the central axis of the rammer-head A, which falls in the longitudinal direction of the chain, extends between the axes of the bolts G and H.

In the position of rest the rammer-chain is withdrawn to such an extent that the rammer-head A is located close to the rammer-housing C. When the ammunition is to be rammed the rammer-chain is moved out from the chain-wheel B by turning the crank D. While this takes place the rollers $g^2$ on the bolts G travel on the upper surface of the rails $c^1$ and the cross-members $F^1$ of the links are moved below the guide-roller E and the chain is brought into the stretched position. Directly after each chain-link has passed into the stretched position the rollers $n^1$ of the clamps K hinged to the appurtenant chain-link hits the inner inclined end of the rails $c^1$ on the housing C. The rollers $n^1$ are then guided between the rails $c^1$ $c^2$ in such a manner that the appurtenant clamps K are swung downwardly to such an extent that their notches $k^1$ come into engagement with the bolts H of the adjacent chain-link. While this swinging movement of the clamps takes place the projections $k^3$ on the clamps first move on that side of the projections $k^2$ of the adjacent clamps which is away from the rammer-head. Finally the projections $k^2$ come to rest on the projections $k^3$. The chain-links are then coupled with one another by the clamps K and the clamps prevent the release of one another. When the chain-links assume the stretched position and the clamps assume the aforesaid coupling position it is apparent that the part of the chain projected from the rammer-housing cannot be bent by the action of the resistance of the ammunition to be rammed or by the gravity of the chain *per se* or by other downwardly and upwardly directed forces. The projected part of the chain therefore forms a self-supporting shank which is secured against bending in any direction. When the driving wheel B is turned in the opposite direction to move the rammer-chain into the housing C, the rollers $n^1$ and the guide-rails $c^2$ cause the clamps K to be swung upwardly. The projections $k^2$ of the clamps K then first move upwardly away from the projections $k^3$ of the adjacent clamps. Finally the projections $k^3$ swing in front of the projections $k^2$ on the side away from the rammer-head. The coupling of the chain-links and the locking of the clamps K is thus eliminated so that the chain can become wound on the chain-wheel B.

It is evident that the chain-housing might be arranged in such a manner that the projected part of the chain assumed an inclined or a vertical direction instead of a horizontal direction. The fact that the direction of projection of the chain may be vertical makes it posible to also use the chain according to the present invention for ammunition-hoists.

Attention is drawn to the fact that it is old to provide chains with hinged clamps which couple the links of the chain together in their stretched position and have projections which prevent release of the adjacent clamps. As compared with the known chains of this type the device according to the present invention is distinguished by simplicity, compactness and reliable action.

Having thus described the invention, what is claimed and desired to be secured by Letters Patent is:

1. A chain especially adapted for ammunition rammers comprising links and clamps hinged to the links and adapted to couple the links together in their stretched position; said clamps being individually and pivotally mounted at one end to the links and having their free ends constructed to engage with the next adjacent clamps; and a guide-way constructed to be engaged by and move the clamps into engaging position when the chain is moved into the stretched position, and adapted to engage with and move the links out of engaging position when the chain is moved into collapsed position.

2. A chain especially adapted for ammunition rammers comprising links and clamps hinged to the links and adapted to couple the links together in their stretched position; said clamps being pivotally mounted at one end to the individual links, arranged to swing all in the same direction, and having their free ends constructed to engage with the pivot mountings of the next adjacent clamps, and a guide for swinging the clamps into engaging position when the chain moves into the stretched position, and to move the clamps out of engaging position when the chain is moved into collapsed position.

3. A chain especially adapted for ammunition rammers, comprising links and clamps hinged to the links and adapted to couple the links together in their stretched position; said clamps being uniformly distributed on the links and arranged in such a manner that they swing in one direction when the chain moves into the stretched position, while they swing in the opposite direction when the chain moves into collapsed position; said clamps being adapted to engage the hinge-bolts of the adjacent clamps when in their coupling position; and said clamps having projections whereby the clamps secure one another in the coupling position, said projections being located on the same side of the clamps with regard to the swinging axis of the clamps.

4. A chain especially adapted for ammunition rammers, comprising links and clamps hinged to the links and adapted to couple the links together in their stretched position; said clamps being uniformly distributed on the links and arranged in such a manner that they swing in one direction when the chain moves into the stretched position, while they swing in the opposite direction when the chain moves into collapsed position, each of said clamps consisting of a one-armed lever which has a notch near its free end adapted to engage the hinge-bolt of the adjacent clamp, and said clamps having projections whereby the clamps secure one another in the coupling position, said projections being located one on each side of said notch.

The foregoing specification signed at Barmen, Germany, this 30th day of August, 1909.

BERNHARD VOGELER. [L. S.]

In presence of—
 OTTO KÖNIG,
 WILLY KLEIN.

Copies of this patent may be obtained for five cents each, by addressing the "Commissioner of Patents, Washington, D. C."